Figure 1:
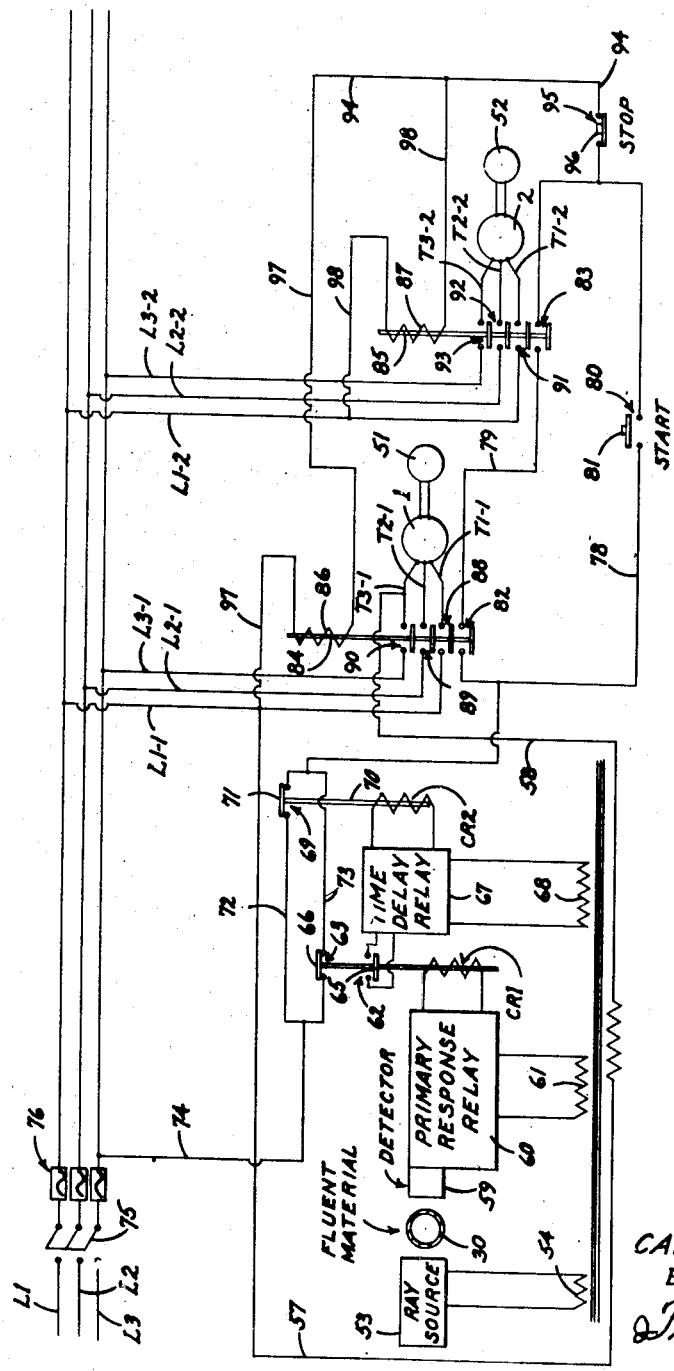

Feb. 15, 1949.　　　C. DE BRABANDER　　　2,461,592
INSPECTION SYSTEM
Filed Sept. 28, 1946　　　2 Sheets-Sheet 1

INVENTOR.
CAMIEL DE BRABANDER
BY
Thomas R. O'Malley

Patented Feb. 15, 1949

2,461,592

UNITED STATES PATENT OFFICE 2,461,592

INSPECTION SYSTEM

Camiel de Brabander, Newport, Del., assignor to American Viscose Corporation, Wilmington, Del., a corporation of Delaware Application September 28, 1946, Serial No. 700,151

16 Claims. (Cl. 103—11)

This invention relates to an inspection system and is particularly concerned with a system for influencing the flow of a material when such material exhibits substantial changes in ray absorption characteristics, particularly those of an optical or related nature, which changes are not merely of momentary or occasional occurrence, but of extended duration.

By ray absorption characteristics it is meant to include the absorption occurring during the reflection or transmission of light or other radiant energy, such as infra-red, ultraviolet, and the like, as well as X-rays, $\beta$-rays, $\gamma$-rays, $\alpha$-rays, and the like.

In general, it is the object of the invention to provide a source of rays and a detector in cooperative relation to the flowing material, a response system comprising at least one actuatable element for influencing the flow-controlling system which produces an effective response only when the impulse on the detector is sustained for a minimum predetermined time interval, and a control system which alters the flow of the material only when there is such an effective response from detection of a sustained impulse of the detector to effect an actuation of the actuatable element. In this way momentary or transient conditions of change are virtually ignored while the flow of the material is controlled in response to changes in characteristics of longer duration.

The detector, which is of the appropriate type to sense the particular rays employed, is arranged with respect to the fluent material to be inspected so that it receives the rays proceeding from a suitable source either transmitted through or reflected by the material as it passes the inspecting station. The nature of the conveyor or conduit depends on the particular type of ray used. If a closed conduit is used it must transmit the ray without sufficient absorption to prevent detection. If an open conduit, such as a trough, is used, its effect on the rays can be disregarded by operating on the reflection principle, that is, by detecting rays reflected from the material exposed at the top.

The material to be inspected in its normal condition may either be substantially opaque or at least partially transparent to the rays used. Thus, if it is normally opaque, the inspection system can be employed to detect changes to partial or complete transparency. Thus, a solution or dispersion of a dye, pigment, filler or like particulate substance which is opaque to the particular rays employed (e. g. carbon black to visible light rays, a red dye to selected blue wave lengths, $BaSO_4$ to X-rays) in a transparent medium, such as cellulose acetate, other cellulose derivatives, or synthetic resins, such as methyl methacrylate, "Vinyon" and the like, either in fused condition or dissolved in a solvent, as acetone, etc., may be passed through the inspection station and the detector will perceive any changes in the particulate concentration which allows the passage of a predetermined amount of the rays. When the material is completely transparent in normal condition, the detector may be used to perceive changes toward opacity of a predetermined magnitude. Thus, in making a transparent solution from solid particles, if an undissolved mass is passed through, it will be detected. Again, when a material which is normally partially transparent is dealt with, the detector may perceive changes in either direction toward or away from greater opacity. The material inspected may be a particulate solid mass, and the system can thus be used to detect deviations from uniformity of mixing when particulate materials of different ray-absorbing characteristics are to be intimately mixed. For this purpose, the mixture may pass through a trough under the inspection stage and the reflection principle should be used.

The system may be employed for other purposes than merely to control the quality of product. Thus, for example, material-handling units which may be harmed if the material contains any irregularity of predetermined magnitude may be protected from damage by the inspection system. For example, in pumping certain liquids, such as oils, non-aqueous solutions or dispersions, and in many cases even aqueous solutions or dispersions, such as a viscose spinning solution, no special provision is made to lubricate the pump, the liquid being conveyed serving this purpose. In such cases, it is desirable to detect when the material is not properly flowing to the pump and to stop the operation of the pump. In such cases also, it is frequently undesirable to pump air or any other gas that may be present into the liquid previously handled when the flow of such liquid ceases. For example, in pumping a viscose spinning solution from one aging tank to another or to the spinning tank or tanks it is desirable to avoid pumping excessive air or gas into the system because this increases the de-aerating burden of the spinning tank. The inspection system detects the increase in transparency resulting from the inclusion of air or gas bubbles, and in all such cases, the system either warns the operator to stop the pump or automatically interrupts the supply of current to the motor driving the pump.

Occasional gas bubbles (such as of H₂S) may be present in the viscose spinning solution (or in any other of the solutions mentioned), but it is not necessary or desirable to stop the pump for such momentary, insignificant changes. The present system skips over occasional bubbles of less than a predetermined magnitude but stops the system when the occurrence of bubbles is more persistent and produces a sustained impulse upon the detector.

The inspection system of the present invention may be used to control the flow of the material inspected in various ways. It may merely signal (by sound or visual effects) a warning to the operator to manually interrupt or divert the flow of the material, or it may automatically interrupt or divert the flow as by operating a control circuit for the motor driving a pump, valve, or the like.

The advantage and value of the system of the present invention is apparent from the above, in that it assures no interruption or diversion of the flow unless the change in characteristics of the material is more than a mere momentary or transitory condition. The time of duration of the impulse of the detector needed to produce an effective response for influencing the flow of the material may be preselected in accordance with the particular material being handled, the rate of flow past the inspection station, and the permissible variation in characteristics of the material. The latter factor will depend on whether the inspection is for the purpose primarily for quality of product or for protecting the equipment handling the product. Thus, if the system is provided to detect relatively small agglomerated masses of undissolved particles having a predetermined size in a transport solution flowing in a conduit of small cross-section at a fast rate, the time intervals may be less than a second in duration. If the flow is at a lower speed, a correspondingly increased time interval is needed and it may be several seconds or even a minute or more. In the case of protecting pumps, such as those handling viscose and feeding it at a rate of 16 to 32 gallons per minute through a 4-inch diameter pipe at the inspection station, the time intervals may be about 40 to 30 seconds respectively.

The drawing is illustrative of a preferred embodiment, in which—

Figure 2:
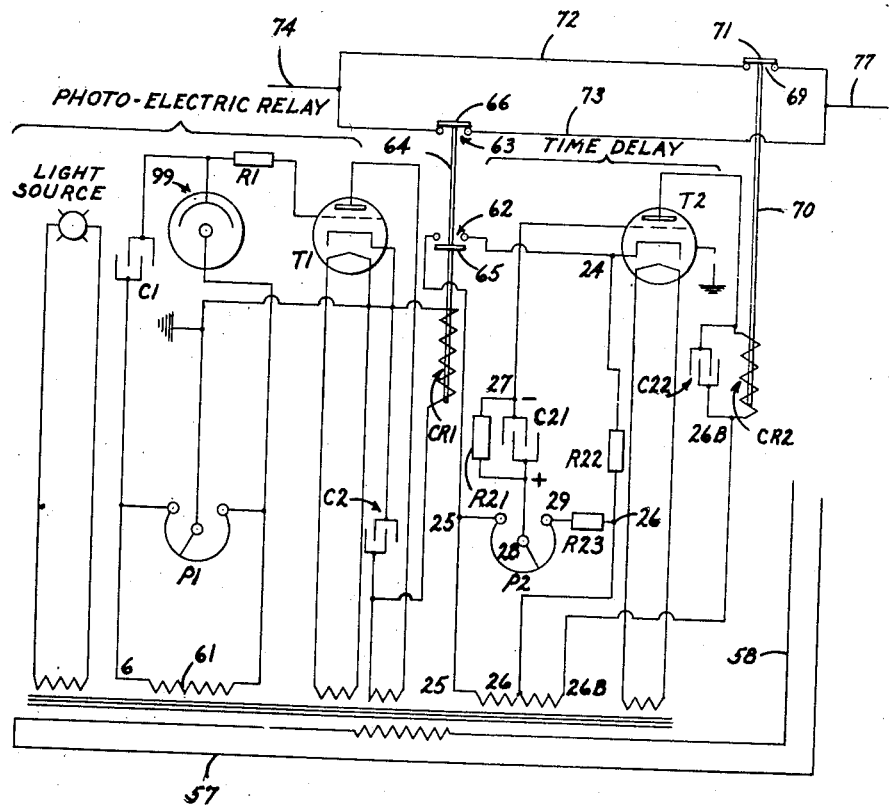

Figure 1 is a diagrammatic view of the system as applied to the control of a pumping system primarily for protective purposes, and Figure 2 is a diagrammatic view showing a specific form of relay system.

As shown in Figure 1, the material flows through conduit 30 on its way to one or more pumps 51, 52 (in sequence when two or more pumps are involved) driven by motors 1 and 2. It is to be understood that the invention is applicable whether one, two, three or any other numbers of pumps are receiving the material, in sequence when a plurality of pumps are used. As shown, the ray source 33 derives its current from a coil of a transformer 55 whose primary 56 is connected by leads 57 and 58 to the lead L1—1 and the motor terminal lead T3—1 respectively.

A detector 59 is disposed to receive rays transmitted through the material in conduit 30 and is connected with a primary response relay 60, which may be connected to the secondary coil 61 of the transformer 55. Its relay coil CR1 is operatively associated with a pair of normally open contacts 62 and a pair of normally closed contacts 63. When the coil CR1 is energized in response to an impulse transmitted by the detector 59, contacts 62 are closed and contacts 63 are opened, as by the motion (in opposition to gravity as in conventional fashion) of the inductively related actuatable core element 64 carrying the insulated conductive connectors 65 and 66.

Closing of contacts 62 initiates operation of the time relay 67 which may be coupled to the transformer 55 by a secondary coil 68 and has the relay coil CR2. At the conclusion of the time interval for which the time relay is set, such interval starting with the instant of the closing of contacts 62, coil CR2 is energized (unless, in such interval contacts 62 should reopen because of termination of the impulse on the detector) and opens the pair of normally closed contacts 69, as by the motion of the actuatable core element 70 inductively related to coil CR2 and carrying the conductive bar 71.

Contact pairs 63 and 69 are disposed in parallel branch lines 72 and 73 forming a part of the starter maintaining circuit for the motors 1 and 2 comprising the lead 74 connected to L3 of the three-phase alternating current line (which may be 440 volts illustratively) comprising lines L1, L2, L3 which may be provided with a master switch 75 and individual fuses at 76. If desired, the branch lines to each motor (e. g. L1—1, L2—1, L3—1, etc.) may be provided with a separate master switch and individual fuses, as is conventional. On the other side of the lines 72 and 73, they are joined by line 77 to two branch lines 78 and 79, the former of which contains the pair of normally open contacts 80 which are closed temporarily by the push button switch 81 for starting the motors, and the latter of which contains the seal-in contact pairs 82 and 83 which are open before the motors are started but which are closed upon closing start switch 80 as a result of the motion of cores 84 and 85 under the influence of starter coils 86 and 87, the three pairs of contacts connecting the lines to the terminals of each of the motors (88, 89 and 90; 91, 92 and 93) being closed simultaneously therewith.

The juncture of branches 78 and 79 shown at the right of Figure 1 is connected to a line 94 containing the normally closed contacts 95 which are opened by the stop push button switch 96. A line 97 connects line 94 with the line L1—1 and contains starter coil 86 of motor 1. A similar line 98 connects line 94 with L1—2 and contains starter coil 87 for motor 2. Thermostatically controlled overload switches may be provided in series in each of lines 97 and 98, the former being opened in response to overloading of any two of the terminal leads to motor 1 (e. g. T1—1 and T3—1) and the latter in response to thermal overloading of T1—2 and T3—2. These being conventional are not shown.

In operation, the master switch 75 is closed and the pump motors are started by pressing the start button 81. This causes current to flow through the starter-maintaining circuit comprising 74, both 72 and 73, 77, 78, 94, 97, 98, and starter coils 86 and 87 close and maintain closed the seal-in contacts 82 and 83. After release of the starter button 81, it opens so current through the maintaining circuit goes through 79 instead of 78.

If the detector senses a change, such as would be caused by an air bubble, it operates the primary response relay 60 which opens contacts 63 in the branch line 73 of the maintaining circuit and closes contacts 62 thereby initiating operation of the time relay 67 which at a predetermined time later opens contacts 69 in branch line 72 unless contacts 62 should open prior to such time in which case relay 67 is ineffective. It will be noted that the maintaining circuit cannot be interrupted unless both pairs of contacts 63 and 69 are opened. Ordinarily, if a single bubble passes through conduit 30, contacts 63 and 69 will open in order and 63 will be closed at the later time when contacts 69 open. However, if the bubbles are frequent or of continuous nature, detector 59 will receive a sustained impulse and the opening of contacts 63 by relay CR1 in response to such an impulse will continue until the opening of contacts 69 results from operation of the time relay. When both contacts 63 and 69 are in actuated, i. e. open condition simultaneously, the current in the maintaining circuit decays and contacts 82 and 83 open, causing the motors to stop until restarted. When such stoppage occurs, the operator must connect a full tank of the material being handled, such as aging viscose, before restarting the pumps. A signal, sound or visual, may be connected with the system to provide the operator with additional warning of the stoppage. Of course, stopping may be manually effected by pushing the stop button 96.

In Figure 2, a specific form of relay system is shown in connection with the pump motor maintaining circuit of Figure 1 of which only lines 74, 72, 73 and 77 are shown, the remainder of the maintaining circuit and the relationship of the ray source and the detector being understood to be identical with or equivalent to the corresponding relationships shown in Figure 1. In the following description, the relays will be discussed separately.

PRIMARY RESPONSE RELAY

This relay comprises a photocell or photo-electric tube 99 which utilizes the change in photo-electric effect caused by a substantial change in light flux impinging upon its photo-electric tube to operate through the proper amplifying equipment and a relay capable of handling the power requirements for the externally controlled circuits.

Referring to the diagram of Figure 2, the relay operates as follows:

When terminal 6 of the transformer secondary 61 is positive, both the three element vacuum tube T1 and the photo tube anodes are negative; hence no current flows in either circuit inasmuch as electron tubes are inherently rectifiers. However, if capacitor C1 be considered to have zero charge, the grid of the tube T1 will be positive when terminal 6 is positive and grid current limited by resistor R1 will flow to charge the capacitor C1.

Upon reversal of the A. C. voltage, the amplifier tube and the photo-electric tube anodes become positive, but the amplifier tube grid is negative by an amount equal to the charge of the capacitor C1 plus the voltage from terminal 6 to the slider of potentiometer P1 and therefore no current flows in the amplifier tube T1 anode circuit. But if there be light impinging upon the photo tube, current passes through it to the capacitor C1 in the direction which tends to discharge the capacitor and charge it in the opposite sense. As the voltage in the capacitor C1 decreases and finally reverses, the tube T1 grid is made less and less negative with respect to the cathode and finally reaches a potential which permits current to flow in the anode circuit. The current of the amplifier tube first flows largely into the smoothing capacitor C2 inasmuch as the inductive effect of the magnetic circuit of the relay CR1 tends to maintain zero magnetic flux linkages in the relay coil at the beginning of the current flow in the anode circuit.

Shortly after anode current of the amplifier T1 starts to flow, the anode voltage of this tube again reverses and the anode current stops. However current flows in the local circuit composed of capacitor C2 and the coil of the CR1 relay until the energy stored in that circuit is dissipated in the coil resistance. C2 is made sufficiently large to enable it to maintain continuous current through the coil of the CR1 relay between pulses of the amplifier tube anode current before the average value of current in the relay reaches the value necessary to operate the relay. Hence the relay has but small tendency to chatter at the critical average current value for pick-up.

This complete series of events is repeated each cycle as long as there is light impinging upon the photo-electric tube. With no light on the photo-electric tube, the action during each half cycle when terminal 6 is positive is the same as before. But in this case when the A. C. voltage reverses, practically no current flows in the photo-electric tube and therefore capacitor C1 is not discharged but maintains its negative charge and keeps the grid negative throughout the positive half cycle, therefore prohibiting flow of current in the amplifier tube anode circuit.

TIME RELAY

*Switch open, resetting or ineffective position*

With contacts 62 open, capacitor C21 is charged with a polarity as indicated and to the peak of the voltage from terminal 26 to the slider of potentiometer P2 thus resetting the time relay.

The current for charging capacitor C21 flows from the terminal 25 through potentiometer P2 to its slider, through capacitor C21, from the grid to the cathode of tube T2, and through resistor R22 to terminal 26 during the half cycles that terminal 25 is positive with respect to terminal 26. The grid and cathode elements of the tube in this instance function as a simple rectifier in which the grid acts as an anode.

*Switch closed, timing or potentially effective position*

On closing contacts 62, the capacitor C21 starts discharging into resistor R21, and after a predetermined time interval, relay CR2 picks up. This is accomplished as follows:

Closing contacts 62 connects the cathode to the transformer. A circuit is thus established from terminal 26B on the transformer, through the coil of relay CR2, from anode to cathode and then to terminal 25 on the transformer.

The voltage applied to the grid of the tube T2 consists of two parts: the A. C. voltage from terminal 25 to the slider of the potentiometer, and the D. C. voltage across capacitor C21. As the D. C. voltage in the grid circuit is greater than the A. C. voltage in the grid circuit, the tube does not pass current. However, the D. C. voltage immediately commences to decrease because capacitor C21 discharges into resistor R21 and after a definite time the tube passes sufficient current to pick up the relay CR2. The length of the time delay can be adjusted by potentiometer P2. The CR2 relay is equipped with one pair normally closed contacts 69 for controlling line 72 after a time delay. The capacitor C22 is for the purpose of supplying current to coil of relay CR2 on half cycles during which the tube T2 does not pass current.

Opening contacts 62 drops out relay CR2 and allows capacitor C21 to be recharged.

Since the opening of contacts 69 by actuation of element 71 is the essential act upon which control is effected, it is clear that branch lines 73 containing contacts 63 and the actuatable element 66 can be partially or entirely omitted without loss of function and accordingly such omission is considered within the scope of the present invention. In the preferred embodiment, however, both actuatable elements 66 and 71, both branch lines 72 and 73, and both pairs of contacts 63 and 69 are used since in this manner the average current load through contacts 69 is reduced.

It is to be understood that changes and variations may be made in the specific embodiments described and/or shown without departing from the spirit and scope of the invention as defined in the appended claims.

I claim:

1. In combination, a ray source, a ray detector, means for feeding a fluent material through a path comprising an inspecting station disposed in the ray path from the source to the detector, two actuatable elements, means for actuating one of the elements in response to an impulse of the detector, means the operation of which is initiated by the actuation of said one element for actuating the other element only after the actuated condition of the first is maintained for a minimum predetermined interval of time by an impulse of sustained character on the detector, and means influenced by the simultaneous existence of the actuated condition of both elements for altering the operation of the feeding means.

2. In combination, a ray source, a ray detector, means for feeding a fluent material through a path comprising an inspecting station disposed in the ray path from the source to the detector, control means for the feeding means, two actuatable elements, means for actuating one of the elements in response to an impulse of the detector, means the operation of which is initiated by the actuation of said one element for actuating the other element only after the actuated condition of the first is maintained for a minimum predetermined interval of time by an impulse of sustained character on the detector, means influenced by the simultaneous existence of the actuated condition of both elements for initiating operation of the control means.

3. In combination, a ray source, a ray detector, means for feeding a fluent material through a path comprising an inspecting station disposed in the ray path from the source to the detector, means for controlling said feeding means comprising an electric circuit, two actuatable switch elements in the circuit, means for actuating one of the elements in response to an impulse of the detector, means the operation of which is initiated by the actuation of said one element for actuating the other element only after the actuated condition of the first is maintained for a minimum predetermined interval of time by an impulse of sustained character on the detector, and means influenced by the simultaneous existence of the actuated condition of both elements for altering the operation of the feeding means.

4. In combination, a ray source, a ray detector, means for feeding a fluent material through a path comprising an inspecting station disposed in the ray path from the source to the detector, means for controlling said feeding means comprising an electric circuit, two branch lines in parallel in said circuit, a normally closed actuatable switch element in each of the lines, means for actuating one of the elements in response to an impulse of the detector, means the operation of which is initiated by the actuation of said one element for actuating the other element only after the actuated condition of the first is maintained for a minimum predetermined interval of time by an impulse of sustained character on the detector, said controlling means influenced by the simultaneous existence of the actuated condition of both elements for altering the operation of the feeding means.

5. In combination, a ray source, a ray detector, means for feeding a fluent material through a path comprising an inspecting station disposed in the ray path from the source to the detector, means for controlling said feeding means comprising an electric motor and a control circuit for the motor comprising two actuatable switch elements therein, means for actuating one of the elements in response to an impulse of the detector, means the operation of which is initiated by the actuation of said one element for actuating the other element only after the actuated condition of the first is maintained for a minimum predetermined interval of time by an impulse of sustained character on the detector, and means influenced by the simultaneous existence of the actuated condition of both elements for altering the operation of the feeding means.

6. In combination, a ray source, a ray detector, means for feeding a fluent material through a path comprising an inspecting station disposed in the ray path from the source to the detector, an electric motor for driving said feeding means, a maintaining circuit for the motor, said circuit comprising two branch lines in parallel in said circuit, a normally closed, actuatable switch element in each of the lines, means for actuating one of the elements in response to an impulse of the detector, means the operation of which is initiated by the actuation of said one element for actuating the other element only after the actuated condition of the first is maintained for a minimum predetermined interval of time by an impulse of sustained character on the detector, whereby the motor is stopped upon the simultaneous existence of the actuated condition of both elements.

7. In combination, a ray source, a ray detector, means for feeding a fluent material through a path comprising an inspecting station disposed in the ray path from the source to the detector, two actuatable elements, a relay for actuating one of the elements in response to an impulse of the detector, a time relay for actuating the other element, means the operation of which is initiated by the first relay in response to an impulse of the detector for effecting operation of the time relay only after the actuated condition of the first element is maintained for a minimum predetermined interval of time by an impulse of sustained character on the detector, and means influenced by the simultaneous existence of the actuated condition of both elements for altering the operation of the feeding means.

8. In combination, a ray source, a ray detector, means for feeding a fluent material through a path comprising an inspecting station disposed in the ray path from the source to the detector, means for controlling said feeding means comprising an electric circuit, two actuatable switch elements in the circuit, a relay for actuating one of the elements in response to an impulse of the detector, a time relay for actuating the other element, means the operation of which is initiated by the first relay in response to an impulse of the detector for effecting operation of the time relay only after the actuated condition of the first element is maintained for a minimum predetermined interval of time by an impulse of sustained character on the detector, and means influenced by the simultaneous existence of the actuated condition of both elements for altering the operation of the feeding means.

9. In combination, a ray source, a ray detector, means for feeding a fluent material through a path comprising an inspecting station disposed in the ray path from the source to the detector, means for controlling said feeding means comprising an electric motor and a control circuit for the motor comprising two actuatable switch elements therein, a relay for actuating one of the elements in response to an impulse of the detector, a time relay for actuating the other element, means the operation of which is initiated by the first relay in response to an impulse of the detector for effecting operation of the time relay only after the actuated condition of the first element is maintained for a minimum predetermined interval of time by an impulse of sustained character on the detector, and means influenced by the simultaneous existence of the actuated condition of both elements for altering the operation of the feeding means.

10. In combination, a ray source, a ray detector, means for feeding a fluent material through a path comprising an inspecting station disposed in the ray path from the source to the detector, means comprising an electrically actuatable element for altering the operation of the feeding means, a relay responsive to an impulse of the detector, a time relay for actuating said element, a circuit containing a normally open switch for controlling the time relay, said controlling circuit preventing operation of the time relay except after the termination of a predetermined time interval during which the switch is closed, and means connecting the switch to the first-mentioned relay to close the switch upon energization of said relay.

11. In combination, a ray source, a ray detector, means for feeding a fluent material through a path comprising an inspecting station disposed in the ray path from the source to the detector, means for controlling said feeding means comprising an electric motor and a control circuit for the motor comprising an actuatable switch element therein, a relay responsive to an impulse of the detector, a time relay for actuating said switch element, a circuit containing a normally open switch for controlling the time relay, said controlling circuit preventing operation of the time relay except after the termination of a predetermined time interval during which the switch is closed, means connecting the switch to the first-mentioned relay to close the switch upon energization of said relay.

12. A protective system for pumps, such as handle viscose and like materials which serve to lubricate the pump, comprising in combination, a light source, a photo-electric cell, a pump for passing the material through a path comprising an inspecting station disposed in the path of light from the source to the cell, an electric motor for driving the pump, a maintaining circuit for the motor, a normally closed switch element in the maintaining circuit, a relay responsive to an impulse of the photocell, a time relay for actuating said switch element, a circuit containing a normally open switch for controlling the time relay, said controlling circuit preventing operation of the time relay except after the termination of a predetermined time interval during which the switch is closed, means connecting the switch to the first-mentioned relay to close the switch upon energization of said relay.

13. In combination, a light source, a photo-electric cell, means for feeding a fluent material through a path comprising an inspecting station disposed in the light path from the source to the cell, two actuatable elements, means for actuating one of the elements in response to an impulse of the detector, means the operation of which is initiated by the actuation of said one element for actuating the other element only after the actuated condition of the first is maintained for a minimum predetermined interval of time by an impulse of sustained character on the detector, and means influenced by the simultaneous existence of the actuated condition of both elements for altering the operation of the feeding means.

14. In combination, a light source, a photo-electric cell, means for feeding a fluent material through a path comprising an inspecting station disposed in the light path from the source to the cell, means for controlling said feeding means comprising an electric motor and a control circuit for the motor comprising two actuatable switch elements therein, a relay for actuating one of the elements in response to an impulse of the detector, a time relay for actuating the other element, means the operation of which is initiated by the first relay in response to an impulse of the detector for effecting operation of the time relay only after the actuated condition of the first element is maintained for a minimum predetermined interval of time by an impulse of sustained character on the detector, and means influenced by the simultaneous existence of the actuated condition of both elements for altering the operation of the feeding means.

15. A protective system for pumps, such as handle viscose and like materials which serve to lubricate the pump, comprising in combination, a light source, a photo-electric cell, a pump for passing the material through a path comprising an inspecting station disposed in the path of light from the source to the cell, an electric motor for driving the pump, a maintaining circuit for the motor, said circuit comprising two branch lines in parallel in said circuit, a normally closed, actuatable switch element in each of the lines, means for actuating one of the elements in response to an impulse of the detector, means the operation of which is initiated by the actuation of said one element for actuating the other element only after the actuated condition of the first is maintained for a minimum predetermined interval of time by an impulse of sustained character on the detector, whereby the motor is stopped upon the simultaneous existence of the actuated condition of both elements.

16. A protective system for pumps, such as handle viscose and like materials which serve to lubricate the pumps, comprising in combination, a light source, a photo-electric cell, a pump for passing the material through a path comprising an inspecting station disposed in the path of light from the source to the cell, an electric motor for driving the pump, a maintaining circuit for the motor, said circuit comprising two branch lines in parallel in said circuit, a normally closed actuatable switch element in each of the lines, a relay for actuating one of the elements in response to an impulse of the detector, a time relay for actuating the other element, means the operation of which is initiated by the first relay in response to an impulse of the detector for effecting operation of the time relay whereby the motor is stopped upon effecting simultaneous actuation of both elements.

CAMIEL DE BRABANDER.

REFERENCES CITED

The following references are of record in the file of this patent:

UNITED STATES PATENTS

| Number | Name | Date |
|---|---|---|
| 2,147,422 | Bendz | Feb. 14, 1939 |

Certificate of Correction

Patent No. 2,461,592. February 15, 1949.

CAMIEL DE BRABANDER

It is hereby certified that error appears in the printed specification of the above numbered patent requiring correction as follows:

Column 3, line 37, for the word "transport" read *transparent*;

and that the said Letters Patent should be read with this correction therein that the same may conform to the record of the case in the Patent Office.

Signed and sealed this 11th day of October, A. D. 1949.

[SEAL]

THOMAS F. MURPHY,
*Assistant Commissioner of Patents.*